(12) United States Patent
Kraemer

(10) Patent No.: US 9,335,046 B2
(45) Date of Patent: May 10, 2016

(54) FLAME DETECTION IN A REGION UPSTREAM FROM FUEL NOZZLE

(75) Inventor: Gilbert Otto Kraemer, Greer, SC (US)

(73) Assignee: General Electric Company, Schenectady, NY (US)

( * ) Notice: Subject to any disclaimer, the term of this patent is extended or adjusted under 35 U.S.C. 154(b) by 707 days.

(21) Appl. No.: 13/484,197

(22) Filed: May 30, 2012

(65) Prior Publication Data

US 2013/0318942 A1   Dec. 5, 2013

(51) Int. Cl.
| F23D 14/82 | (2006.01) |
| F23N 5/08 | (2006.01) |
| F23N 5/24 | (2006.01) |
| F23R 3/46 | (2006.01) |

(52) U.S. Cl.
CPC ............... *F23N 5/082* (2013.01); *F23N 5/242* (2013.01); *F23R 3/46* (2013.01); *F23N 2029/00* (2013.01); *F23N 2029/16* (2013.01); *F23N 2031/28* (2013.01); *Y02E 20/16* (2013.01)

(58) Field of Classification Search
CPC ..... F23N 5/082; F23N 5/242; F23N 2029/00; F23N 2029/16; F23N 2031/28; F23N 2031/46; F23D 14/82
USPC .................... 60/39.091, 773, 793; 431/78, 79
See application file for complete search history.

(56) References Cited

U.S. PATENT DOCUMENTS

| 3,537,804 | A | * | 11/1970 | Walbridge | 431/66 |
| 4,055,997 | A | * | 11/1977 | Kniat | F02C 9/28 |
| | | | | | 374/101 |
| 4,744,670 | A | * | 5/1988 | Janssen | F01D 17/08 |
| | | | | | 374/143 |
| 5,148,667 | A | * | 9/1992 | Morey | F02C 9/00 |
| | | | | | 431/13 |
| 5,199,265 | A | * | 4/1993 | Borkowicz | F23D 14/00 |
| | | | | | 60/737 |
| 5,397,181 | A | * | 3/1995 | McNulty | G01K 13/02 |
| | | | | | 374/144 |
| 5,424,554 | A | * | 6/1995 | Marran | F23N 5/082 |
| | | | | | 250/554 |
| 5,487,266 | A | | 1/1996 | Brown | |
| 5,755,819 | A | * | 5/1998 | Bonanni | F23N 5/082 |
| | | | | | 431/12 |

(Continued)

FOREIGN PATENT DOCUMENTS

| EP | 0816760 A1 * | 1/1998 | ............ F01D 21/003 |
| EP | 0987493 A1 | 3/2000 | |

OTHER PUBLICATIONS

U.S. Appl. No. 13/370,963, filed Feb. 10, 2012.

(Continued)

*Primary Examiner* — William H Rodriguez
*Assistant Examiner* — Eric Linderman
(74) *Attorney, Agent, or Firm* — Ernest G. Cusick; Hoffman Warnick LLC

(57) ABSTRACT

A flame detector in photonic communication with a no-flame region of a combustor of a gas turbine may emit a signal when a photon is detected. A controller may be arranged to receive a signal from the flame detector and may determine whether a flame presence in the no-flame region is indicated responsive to the signal.

17 Claims, 15 Drawing Sheets

(56) References Cited

U.S. PATENT DOCUMENTS

| | | | | |
|---|---|---|---|---|
| 5,857,320 A | * | 1/1999 | Amos | F01D 21/00 60/39.091 |
| 5,978,525 A | * | 11/1999 | Shu | F23D 14/725 385/12 |
| 6,244,856 B1 | * | 6/2001 | Winnington | F23D 14/14 126/92 C |
| 6,599,028 B1 | * | 7/2003 | Shu | F23D 14/725 385/139 |
| 7,047,723 B2 | * | 5/2006 | Martling et al. | 60/39.37 |
| 7,334,413 B2 | * | 2/2008 | Myhre | F01D 17/02 431/13 |
| 7,484,369 B2 | * | 2/2009 | Myhre | F01D 17/02 60/740 |
| 7,942,038 B2 | | 5/2011 | Ziminsky et al. | |
| 8,397,515 B2 | * | 3/2013 | Frederick | F23D 14/82 431/19 |
| 8,456,634 B2 | * | 6/2013 | McManus | F02C 9/00 356/432 |
| 9,115,933 B2 | * | 8/2015 | Wang | F23M 11/045 |
| 9,118,171 B2 | * | 8/2015 | Blakemore | F23M 11/045 |
| 2002/0083711 A1 | * | 7/2002 | Dean | F23R 3/04 60/737 |
| 2006/0059917 A1 | * | 3/2006 | Plimpton et al. | 60/772 |
| 2007/0281260 A1 | * | 12/2007 | McLellan | F23N 5/082 431/79 |
| 2008/0289342 A1 | * | 11/2008 | Sappey | F01D 21/003 60/793 |
| 2009/0112363 A1 | * | 4/2009 | Jambhekar | B01D 53/9431 700/266 |
| 2009/0139236 A1 | | 6/2009 | Yilmaz et al. | |
| 2010/0170217 A1 | * | 7/2010 | Kraemer | F23N 5/184 60/39.091 |
| 2010/0175384 A1 | * | 7/2010 | Kraemer | F23N 5/082 60/773 |
| 2010/0192577 A1 | * | 8/2010 | Singh et al. | 60/725 |
| 2010/0220182 A1 | * | 9/2010 | Krull | F23N 5/082 348/83 |
| 2010/0280732 A1 | * | 11/2010 | Singh | F02C 9/00 701/100 |
| 2010/0318274 A1 | | 12/2010 | Krull | |
| 2011/0000215 A1 | * | 1/2011 | Lacy | F23M 9/02 60/746 |
| 2012/0317990 A1 | * | 12/2012 | Krull | F23N 5/245 60/772 |
| 2014/0352316 A1 | * | 12/2014 | Fadde | F23R 3/002 60/772 |

OTHER PUBLICATIONS

U.S. Appl. No. 13/163,794, filed Jun. 20, 2011.
U.S. Appl. No. 12/692,942, filed Jan. 25, 2010.
Search Report and Written Opinion from EP Application No. 13169805.2 dated Sep. 12, 2013.
Bloxham, Matthew, "Predicting Lean Blowout Using the Damkohler Number" Jul. 28, 2006.

* cited by examiner

FLAME DETECTION IN A REGION UPSTREAM FROM FUEL NOZZLE

BACKGROUND OF THE INVENTION

The disclosure relates generally to control of a power plant, and more particularly to detection of a flame upstream of a combustion chamber of a gas turbine.

In power generation, it is common to use gas turbines and combined cycle power plants to generate electricity in a power system. Such power plants typically include power plant control systems that receive desired outputs or target loads from a power system controller, for example as part of a dispatch schedule generated by the power system controller. Based on the target load, a power plant control system will determine a set point for an operating value of the power plant that should be adopted to produce the target load. The power plant control system may, for example, determine a set point for a firing temperature $T_f$ at which a gas turbine should be operated to achieve the target load. However, some ranges of firing temperature may produce undesirable exhaust products, depending on the particular design of the gas turbine employed.

For example, referring to FIG. 1, a gas turbine 10 may include a compressor 12, a combustor 14, and a turbine 16. Compressor 12 compresses ambient air 18 into compressed air 20, which is supplied to combustor 14 along with fuel 22 to form a fuel-air mixture 24. Fuel-air mixture 24 is burned in combustor 14 to form a heated gas stream 26 that is supplied to turbine 16, which extracts energy from the heated gases to drive a load 28 via a shaft 30. Shaft 30 may also drive compressor 12. A gas turbine 10 may include a number of combustors 14 positioned flow-wise between compressor 12 and turbine 16 so that air flows through compressor 12 and travels through combustors 14 to turbine 16. Typically, compressor 12 and turbine 16 may be aligned along a common longitudinal axis of gas turbine 10, and combustors 14 may be arranged in a circular array about the common axis with discharge ends at an entrance to turbine 16.

Depending on target load, ambient conditions, and other factors, a gas turbine may produce undesirable exhaust components, such as carbon monoxide (CO) or oxides of nitrogen ($NO_x$). To reduce such undesirable exhaust components, dry, low nitrous oxide (DLN) combustors were developed in which fuel and air are mixed prior to entry into the combustion chamber of the combustor ("premixed"). For example, each combustor may include a premix chamber or region 32 into which compressed air 20 and fuel 22 are introduced to form fuel-air mixture 24, which may then be burned in combustion chamber or region 34 of combustor 14. Premixing the air and fuel permits operating the combustors at relatively lower temperatures for a given efficiency and/or target load, which reduces production of undesirable exhaust gases, such as $NO_x$, during the combustion process.

However, conditions may arise in which flame holding may occur in regions of the gas turbine in which combustion may damage or destroy parts of the gas turbine, which may lead to unsafe operating conditions or even catastrophic failure of the gas turbine. Various solutions have been proposed to detect flame holding so that ameliorative steps, such as altering or stopping fuel delivery, changing firing temperature, changing load, changing compressor discharge flow, changing compressor discharge flow conditions, and/or adding a quenching agent or diluent, may be taken. However, such solutions typically rely on detection and response of flame characteristics in the combustion chamber. Other solutions rely on detection of a pressure drop in areas of concern.

In both cases, flame holding in undesirable locations is only implied, as opposed to being detected directly. For example, a flame holding detection system may use an optical sensor in photonic communication with the combustion chamber of a combustor, such as via a fiber optic cable connected to a viewport into the combustion chamber. The optical sensor may be a camera arranged to capture an image of a flame in the combustion chamber so that the image may be checked for characteristics of flame holding, such as by spectral analysis to detect the presence of combustion products indicative of flame holding.

BRIEF DESCRIPTION OF THE INVENTION

Embodiments of the invention disclosed herein may take the form of a gas turbine flame detection system, the gas turbine including a combustor having an inlet in fluid communication with a source of air, a combustion chamber, and a no-flame region between the inlet and the combustion chamber. The flame detection system may include a flame detector in photonic communication with the no-flame region and arranged to emit a signal responsive to a photon emitted in the no-flame region. A controller may be in communication with the flame detector, the controller being arranged to determine whether the flame detector signal indicates flame presence in the no-flame region and to initiate an ameliorative action responsive to an indication of flame presence.

Embodiments of the invention may also take the form of a gas turbine having a compressor and a combustor in fluid communication with the compressor. The combustor may be arranged to receive a discharge of the compressor and at least one fuel delivery system may be arranged to introduce fuel into air entering the combustor to form a fuel-air mixture. A combustion chamber may receive the fuel-air mixture and may be arranged to host controlled combustion of the fuel-air mixture. A flame detector in photonic communication with the no-flame region may be arranged to emit a signal responsive to a photon emitted in the no-flame region. Responsive to receipt of the signal from the flame detector, a controller in communication with the flame detector may determine whether the signal is indicative of a flame presence in the no-flame region and may initiate an ameliorative action responsive to an indication of flame presence.

Another embodiment may include a combustor including an inlet in fluid communication with a source of air and a combustor housing defining a flow path from an inlet to a combustion chamber. The combustion chamber may be arranged to receive a fuel-air mixture from the flow path and to host combustion of the fuel-air mixture. The combustor may include a no-flame region in the flow path between the inlet and the combustion chamber, and a flame detector in photonic communication with the no-flame region may be arranged to emit a signal responsive to receiving a photon from the no-flame region. A controller arranged to receive the flame detector signal may determine whether a presence of a flame in the no-flame region is indicated by the signal and may initiate an ameliorative action responsive to a flame presence indication.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWING

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

The detailed description explains embodiments of the invention, together with advantages and features, by way of example with reference to the drawings.

DETAILED DESCRIPTION OF THE INVENTION

Aspects of the invention provide a flame detection system that indicates the presence of flame in a no-flame region responsive to detecting a photon in the no-flame region. As used herein, "no-flame region" means any area upstream of the combustion chamber of a combustor and/or in which flame holding and/or the presence of a flame is undesirable. As such, a no-flame region may include a portion of a flow path between an air inlet of a combustor and the combustion chamber and may include regions in which fuel nozzles and/or radial fuel injectors are employed.

Figure 2:
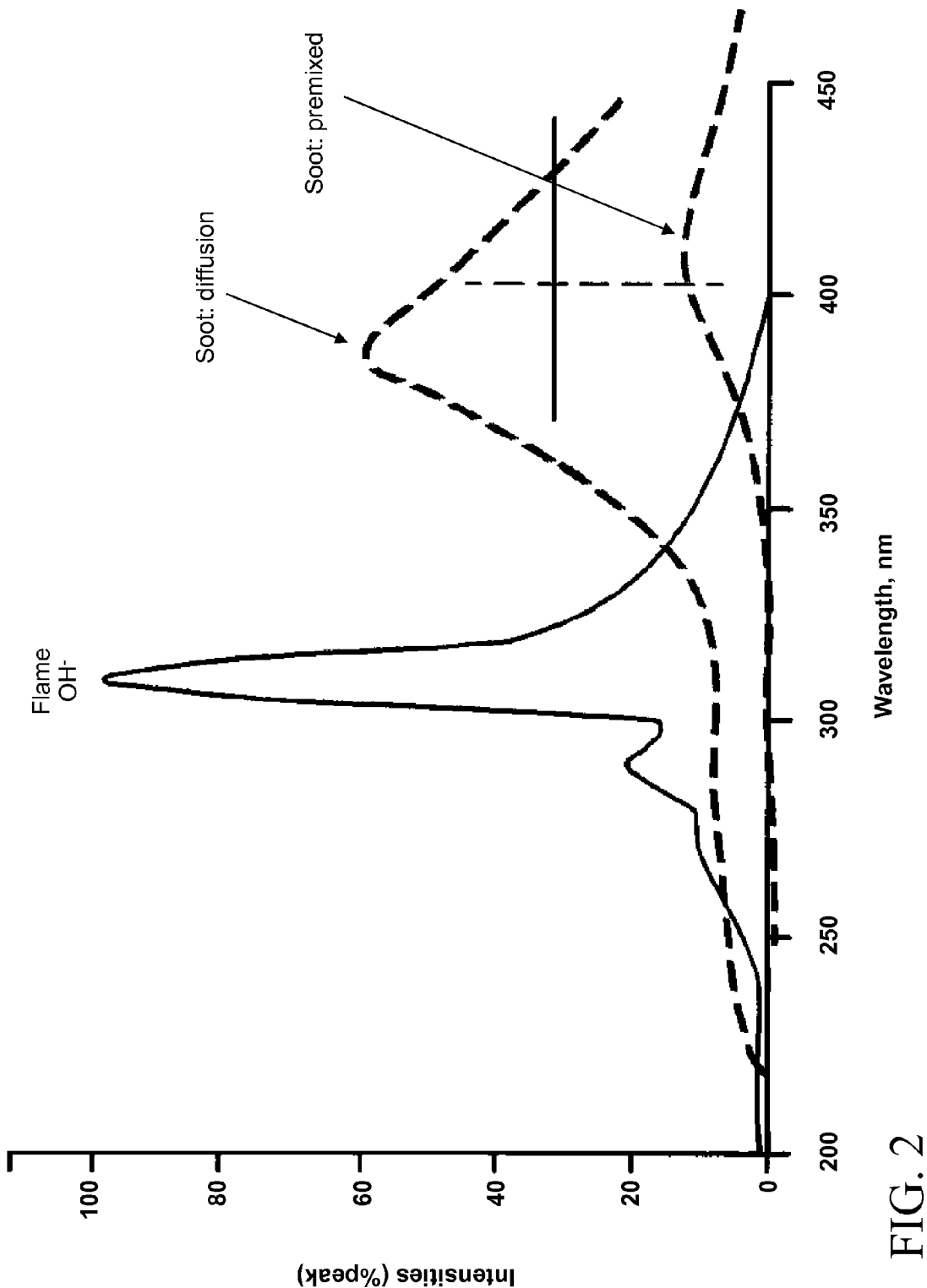
FIG. 2 shows a graph of emission intensity vs. wavelength for several combustion products which may be produced and/or monitored in embodiments of the invention disclosed herein.

FIG. 2 shows emission spectra of three ranges of products, including hydroxyl ions (OH⁻) and premixed and diffusion flame soot radiation. As seen in FIG. 2, hydroxyl ions have a relatively intense emission over a relatively narrow range of wavelengths (from about 300 nm to about 330 nm), while both ranges of soot radiation have lower intensity emissions over a broader range of wavelengths (from about 350 nm to about 450 nm). Emissions from soot produced by diffusion flames typically are in shorter wavelengths, while emissions from soot produced by premix flames are typically in longer wavelengths, depending on the particular temperatures of the flames in which the soot is radiating. In addition, because soot is usually only produced by premixed flames when little or no oxygen is present, premix soot emissions are of lower intensity than diffusion soot emissions. In addition, the emissions of soot are in a longer wavelength band or range or spectrum than that of hydroxyl ions. In particular, both types of soot have peak intensities in the visible light range (about 380 nm to about 740 nm), while hydroxyl ions emit almost completely in the ultraviolet range (generally about 10 nm to about 380 nm).

Since hydroxyl ions are produced from flame holding and/or formation in the no-flame region of a combustor, embodiments may employ one or more flame detector(s) with non-imaging and/or imaging optics to capture photons emitted from flame gases, soot, and/or other radiation sources in the no-flame region. No photons other than infrared of a wavelength and intensity anticipated for unreacted fuel-air mixture and/or hot surfaces should be present in a no-flame region or zone during operation of a combustor. The presence of a photon outside of this regime or predefined range or spectrum of wavelength and/or intensity in the no-flame region, therefore, is a strong indicator of flame presence, a breach in the combustor allowing outside light into the no-flame region, or an open combustor housing, any of which would indicate that the combustor should be shut down or its operation modified. Thus, by signaling the presence of a flame in the no-flame region responsive to detection of one or more undesirable and/or unanticipated photon(s), several conditions requiring shut down, alteration of fuel-air ratio, and/or gas turbine load may be covered. A response may be guided by an observed photonic signal, fuel properties, gas turbine operation, ambient atmosphere data, and/or other parameters as may be suitable and/or desired. For example, fuel may be reduced for a weak signal and/or relatively unreactive fuel/air mixture, while the engine might be immediately shut down or a fuel source upstream of the detected flame location might be modified and/or shut down responsive to a strong signal and/or relatively reactive fuel-air mixtures. Other ameliorative actions may also be possible.

Figure 1:
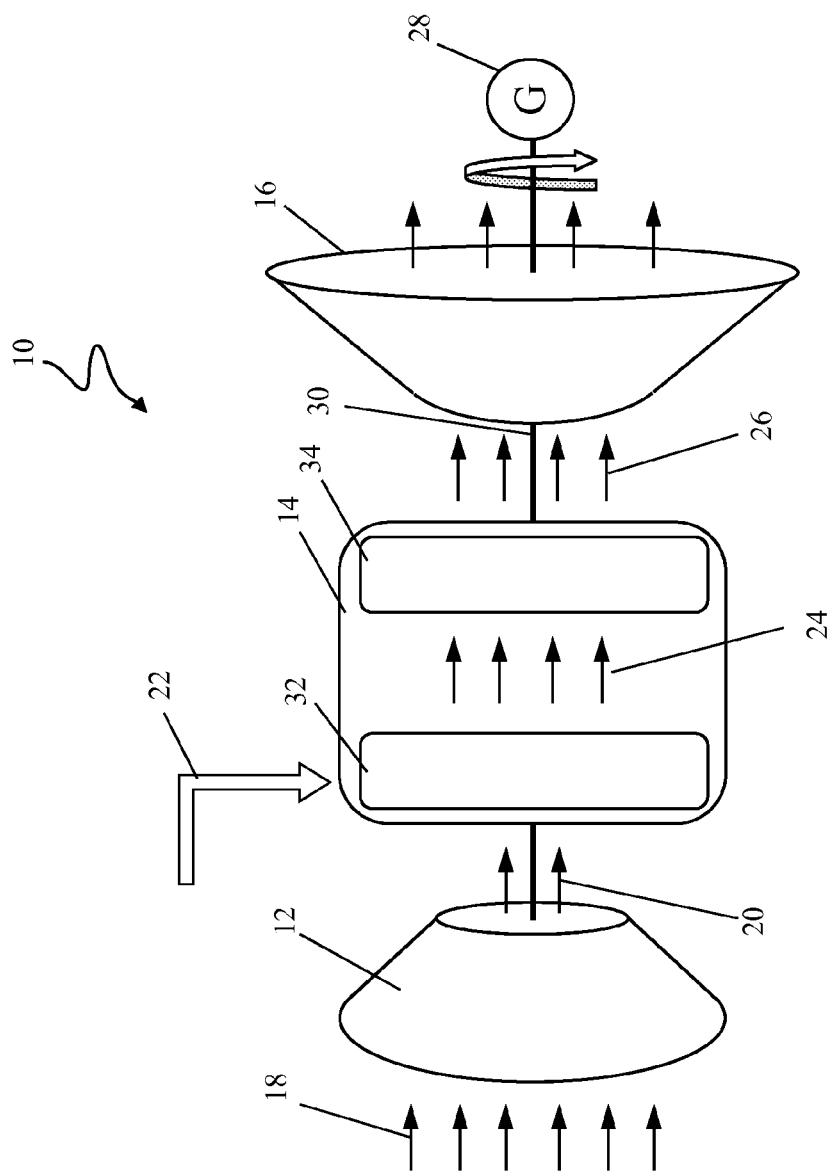
FIG. 1 shows a schematic diagram of a conventional gas turbine with which embodiments of the invention disclosed herein may be employed
Figure 3:
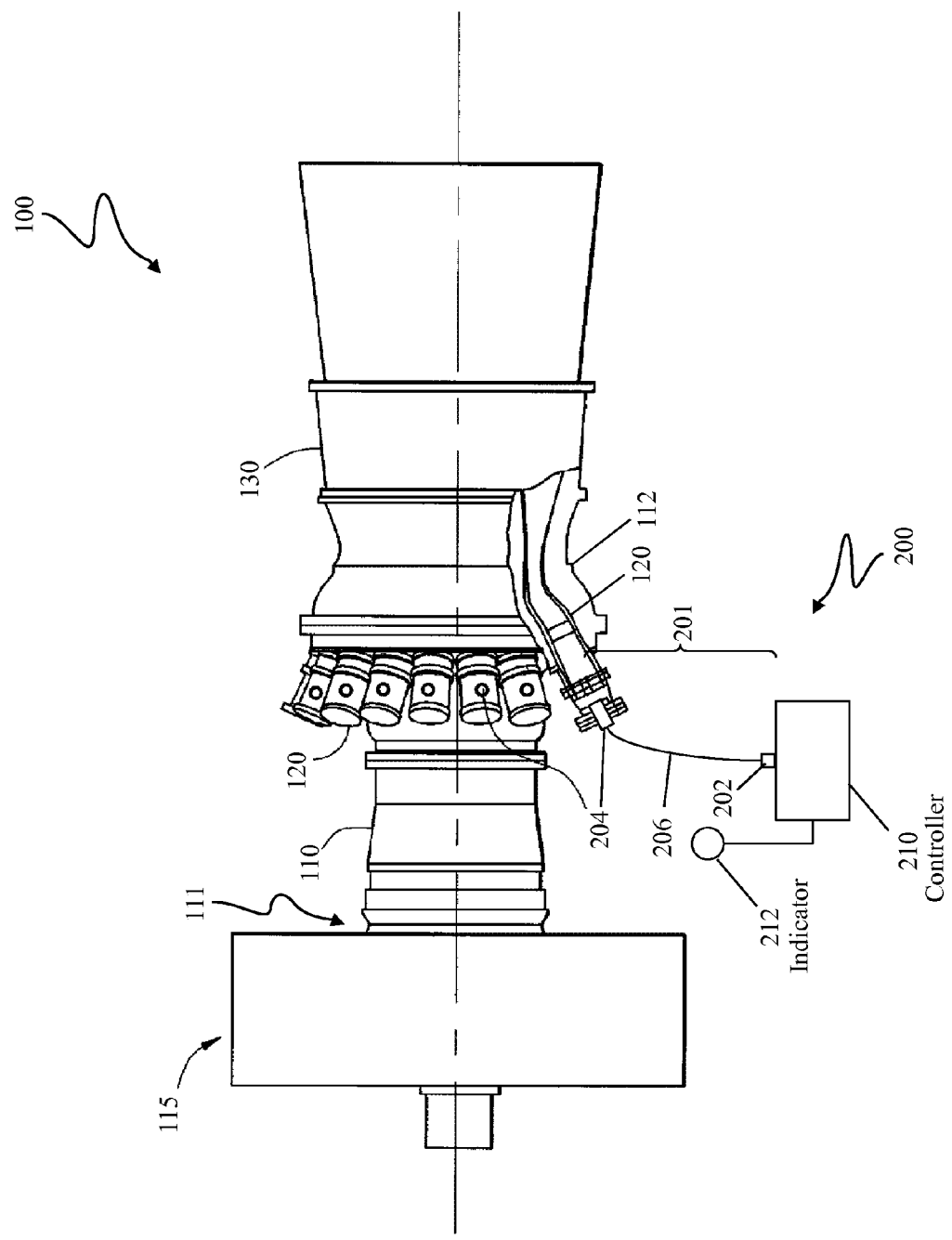
FIG. 3 shows a schematic diagram of a gas turbine including a flame detection system according to embodiments of the invention disclosed herein.

Referring to FIG. 3, a more specific example of a gas turbine 100 described above with respect to FIG. 1 and in which embodiments may be implemented is shown. As with the more general example of FIG. 1, gas turbine 100 may include a compressor 110, a combustor 120, and turbine 130. Compressor 110 and turbine 130 may be aligned along a common longitudinal axis of gas turbine 100, and a plurality of combustors 120 may be arranged in a circular array about the common axis to discharge into turbine 130. In embodiments, combustors 120 may be arranged in or pass through a compressor discharge apron 112 as will be described below. Embodiments may also include a fogger or fogging system 115 at compressor inlet 111 that may allow introduction of a quenching agent, such as water into air entering compressor 110, such as to boost power and/or to suppress flame holding.

A flame detection system 200 may be arranged to monitor combustor 120 and may include a flame detector 201 in photonic communication with a portion of combustor 120 in which flame is undesirable that may be called or referred to as a no-flame region of combustor 120. Flame detector 201 may be connected to flame detection system controller 210 such that when flame detector 201 receives a photon emitted in the no-flame region of combustor 120, flame detector 201 may send a signal to flame detection system controller 210. Flame detection system controller 210 may determine whether a signal received from a flame detector 201 is indicative of a flame presence, i.e. whether a flame has been detected, in the no-flame region. In embodiments, the receipt of a signal may be construed as indicative of a flame presence, while in other embodiments an intensity and/or strength of the signal may be compared to a predefined threshold value such that an intensity and/or strength above the predefined threshold value may be construed as indicative of a flame presence. Flame detection system controller 210 may respond to an indication of a flame presence by, for example, initiating an ameliorative action, such as providing a signal, indicating flame detection and/or presence with an indicator 212, initiating alteration of a fuel-air ratio of combustor 120, initiating shutdown of combustor 120, initiating shutdown of the entire gas turbine 100, and/or another suitable response.

Figure 4:
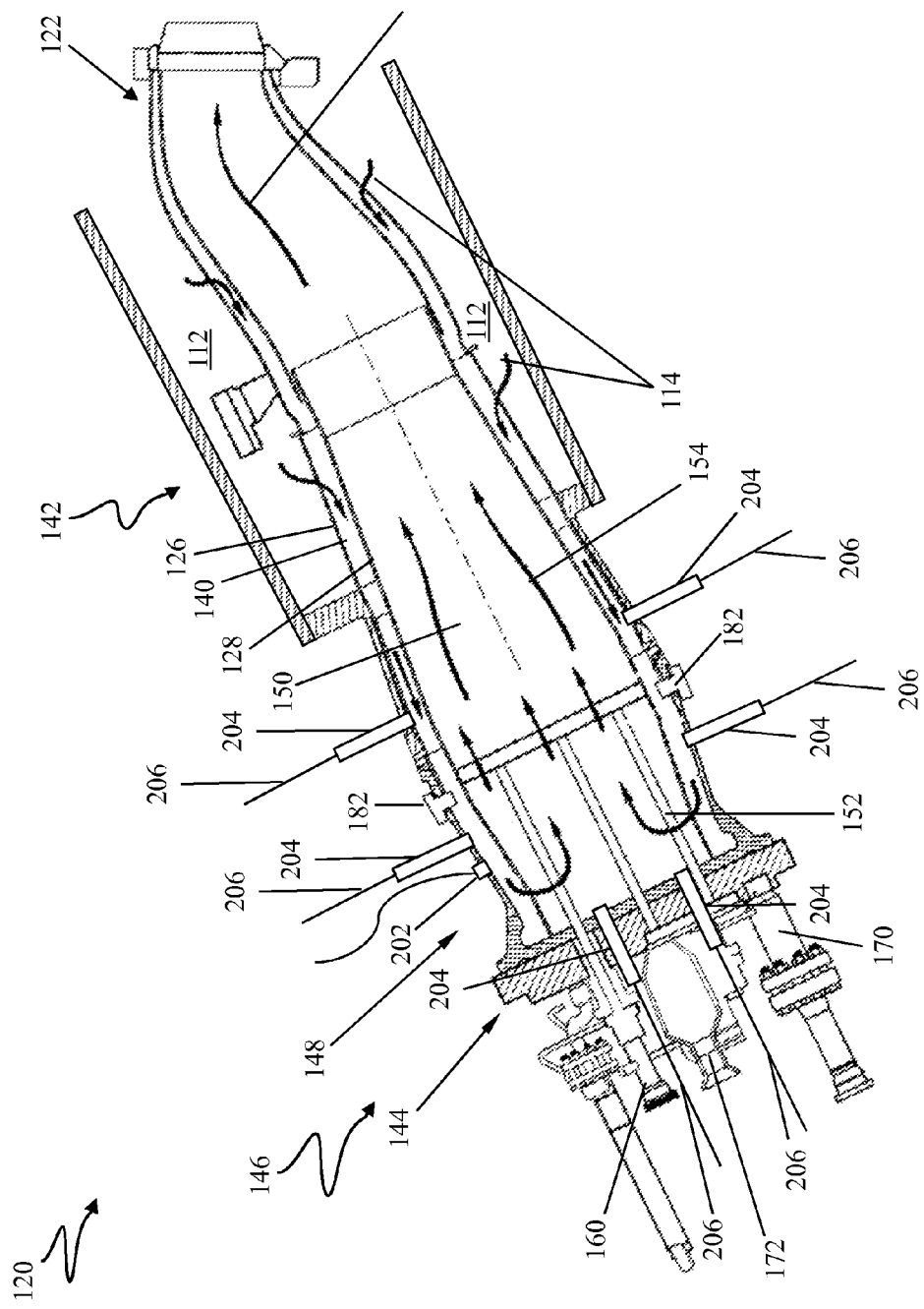
FIG. 4 shows schematic diagram of a combustor including a flame detection system according to embodiments of the invention disclosed herein.

Flame detector 201 may include at least a photon detector 202, which may include any suitable sensing device or detector that produces a signal in response to being struck by one or more photons, such as a photoresistor, a photodiode, a phototube, a charge-coupled device, a modified retina cell, and/or any other suitable photonically responsive sensing device now known and/or discovered and/or developed in the future. While in embodiments photon detector 202 may be mounted on and/or in combustor 120, as seen in FIG. 4, for example, heat from combustion during operation of combustor 120 may introduce electronic noise, such as might be induced by thermal photonic emissions and/or mechanical vibrations, and/or may damage photon detector 202. Hence, it may be desirable to position photon detector 202 some distance from combustor 120 and photonically connected to a photon collector 204 mounted on combustor 120. For example, a photon conduit 206, such as a fiber optic cable, may provide photonic communication between photon collector 204 and photon detector 202. A photon emitted in combustor 120 may thus be received and/or collected by photon collector 204 and travel through photon conduit 206 to photon detector 202.

Because of the potential severity of response should a flame be detected, embodiments may employ two or more flame detectors 201 to reduce likelihood of a false positive flame detection, as will be described in conjunction with FIGS. 7-13 below. In particular, using three or more flame detectors 201 may enable flame detection system controller 210 to use a voting process free from the possibility of a tie vote (one positive, one negative) that may be inconclusive. Thus, voting in flame detection system 200 in embodiments may only indicate flame detection/presence when at least a predefined number of signals, such as two or more signals, are received from flame detectors 201. In addition, while the example flame detector 201 of FIG. 3 shows one photon collector 204 for one photon detector 202, it should be understood that multiple photon collectors 204 may be photonically connected to one photon detector 202, one photon collector 204 may be photonically connected to multiple photon detectors 202, and/or any combination of these arrangements may be employed.

Referring to FIG. 4, a combustor 120 may include a combustor flow sleeve 126 within which a combustion liner 128 may be arranged so that an annular flow passage 140 may be formed between combustor flow sleeve 126 and combustion liner 128. An aft portion 142 of combustor flow sleeve 126 may extend into compressor discharge manifold 112 and may be permeable so that compressed air 114 may enter annular flow passage 140 and travel toward a cap 144 at a forward end 146 of combustor flow sleeve 126. For example, aft portion 142 of combustor flow sleeve 126 may include through holes, mesh, screen, or other formations to render it permeable to compressed air 114. Aft portion 142 of combustor flow sleeve 126 may therefore be considered an inlet of combustor 120. Within combustion liner 128, a premix chamber 148 and a combustion chamber 150 may be formed so that compressed air 114 flows through annular flow passage 140 from aft portion 142 to cap 144, at which point flow may turn and travel through premix chamber 148 to combustion chamber 150, and finally through discharge end 122 to turbine 130 (FIG. 3).

In embodiments, with additional reference to FIG. 4, cap 144 may support one or more fuel nozzles 152 that each may be arranged to premix air, fuel, and/or an additive, such as a diluent or quenching agent, into an air-fuel mixture. Fuel nozzles 152 may be mounted in cap 144, such as in a circular array about a longitudinal axis of combustor 120, projecting into premix region 148 and toward combustion chamber or region 150. During normal operation, compressed air 114 may enter combustion region 150 after passing through or by fuel nozzle(s) 152 and/or through premix region 148 to become part of a fuel-air mixture 154, which is then burned in combustion chamber 150. To facilitate and/or enhance mixing of fuel and air, each fuel nozzle 152 may include a swirl arrangement (not shown), such as vanes or other features, that may induce turbulence and/or vortices in air flowing through and/or around fuel nozzle 152.

Depending on the particular design of gas turbine 100, each fuel nozzle 152 may supply several different fuels, fuel mixtures, and/or additives and deliver such fuels and/or additives from several delivery systems or in several modes. In some gas turbines, three or more fuel delivery systems or modes may be employed, such as a primary fuel delivery system 160, a secondary fuel delivery system 170, and/or a tertiary fuel delivery system 172. Some combustors may employ additional fuel injectors positioned upstream of the fuel nozzles to further improve emissions performance and/or operability. For example, embodiments may employ combustor casing fuel injectors 182 arranged to inject fuel into annular flow passage 140 prior to its arrival at fuel nozzles 152 as part of an annular quaternary fuel delivery system. Premixing fuel and air using combustor casing fuel injectors is typically employed to reduce $NO_x$ emissions, but may also mitigate combustor instability, provide better fuel/air mixing, and improve flame holding margin of the downstream fuel nozzles.

A fuel delivery mode in embodiments may be distinct from a fuel delivery system in that a fuel delivery mode may represent a combination of fuel(s), air, diluent(s), and/or other ingredients and/or additives, each coming from a respective delivery system, to support a particular manner or range of operation of gas turbine 100. Further, each fuel nozzle 152 and/or injector 182 may deliver a different fuel and/or a different mixture of fuel and/or diluent and/or other ingredients and/or additives, such as under direction of a fuel delivery system, per a fuel delivery mode, and/or under direction of a gas turbine control system. In embodiments, distribution of fuel delivery among fuel nozzles 152 and 182 may also vary with fuel delivery mode and/or other operating conditions, such as by using a different flow rate for one or more nozzles 152 and/or injectors 182. In each of these circumstances, variation of fuel composition, mixture delivered by a fuel nozzle 152 or injector 182, and/or distribution of delivery among fuel nozzles 152 and/or 182 may have an effect on flame holding potential in combustor 120.

As discussed above, previous flame detection techniques rely on analyses of what occurs in the combustion chamber. In some cases, such techniques take advantage of the emission spectra of particular products of combustion that may indicate flame holding is occurring or about to occur such as is described above with respect to FIG. 2. Since hydroxyl ions are typically produced from flame holding and/or formation in the no-flame region of a combustor, embodiments may employ a photon detector 202 sensitive to ultraviolet radiation, such as over a predefined range of from about 250 nm to about 450 nm, and particularly over a predefined range of from about 300 nm to about 350 nm. Embodiments could also employ a photon detector 202 sensitive to an even narrower band or predefined range, such as from about 305 nm to about 320 nm. In addition, infrared photons produced by parts of combustor 120, such as thermal emissions from metal components that have been heated above, for example, an inlet temperature of the fuel-air mixture, would have a shorter wavelength, that is, more toward the regime of soot emissions. Embodiments may employ photon detectors sensitive to such infrared photons such that a level of infrared photons exceeding a predefined background level may indicate flame in the no-flame region.

Figure 5:
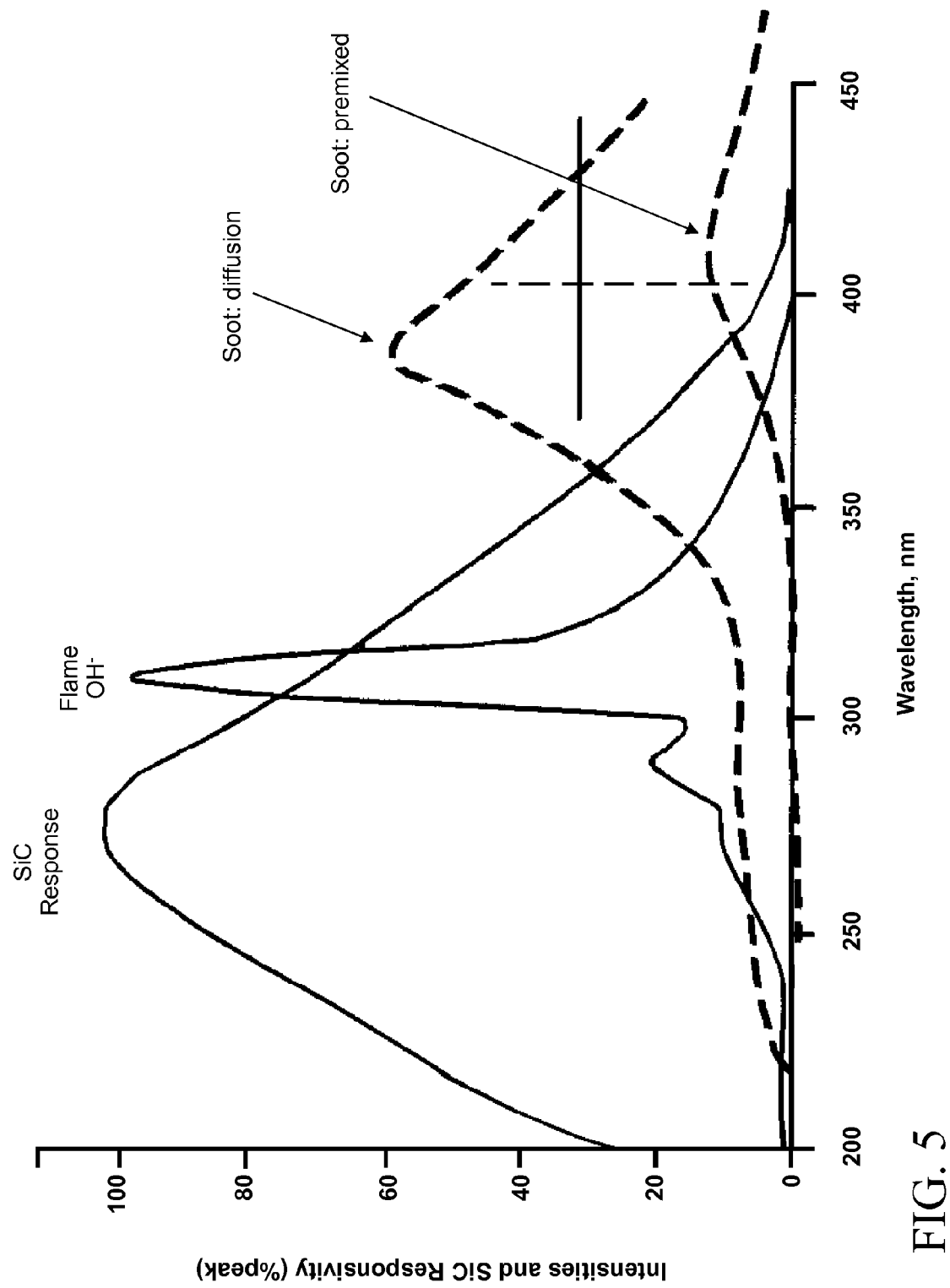
FIG. 5 shows a graph of emission intensity vs. wavelength for several combustion products as well as responsivity vs. wavelength for silicon carbide (SiC), which may be used in embodiments of the invention disclosed herein.

With reference to FIG. 5, a curve of responsivity versus wavelength for silicon carbide (SiC) is shown in overlay with the emission spectra of FIG. 2. SiC is a material that has shown utility in many types of semiconductor devices, including various types of photon detectors. As can be seen in FIG. 5, SiC is particularly responsive to ultraviolet radiation in a range of from about 200 nm to about 350 nm, with substantial responsivity over the same range over which hydroxyl ions emit. At the same time, SiC is not particularly responsive to the wavelengths emitted by soot. Thus, SiC is an example of a material that may be used in photon detector 202 to detect photons emitted by hydroxyl ions, such as those produced as a result of flame production and/or holding. While SiC has been shown as an example, other materials with suitable responsivity and/or band gap may be employed, such as gallium nitride (GaN), filtered and/or unfiltered titanium dioxide ($TiO_2$), aluminum gallium nitride (AlGaN), zinc sulfide (ZnS), diamond, and/or other suitable inorganic and/or organic materials now known and/or discovered in the future as may be used to detect, in particular, ultraviolet radiation.

While previous techniques monitor a combustion chamber of a combustor, embodiments instead monitor areas in which flames are not wanted, areas that together may comprise a no-flame region of combustor 120, as suggested above. For example, referring to FIGS. 3 and 4, portions of annular flow passage 140, cap 144, and premix chamber 148 may be included in such a no-flame region of combustor 120. Embodiments deploy flame detection system 200 to monitor such a no-flame region, particularly premix chamber 148 and/or annular flow passage 140, though embodiments may employ a flame detector 201 to monitor any of various other places in the no-flame region as seen in FIG. 4 as may be appropriate and/or desired. However, since flame holding and/or formation upstream of combustor casing fuel injectors 182 is very unlikely, the no-flame region of embodiments need not extend from the combustor inlet to the entrance of combustion chamber 150, so premix chamber 148 might not be included and/or the portion of annular flow passage 140 upstream of combustor casing fuel injectors 182 might not be included.

Figure 6:
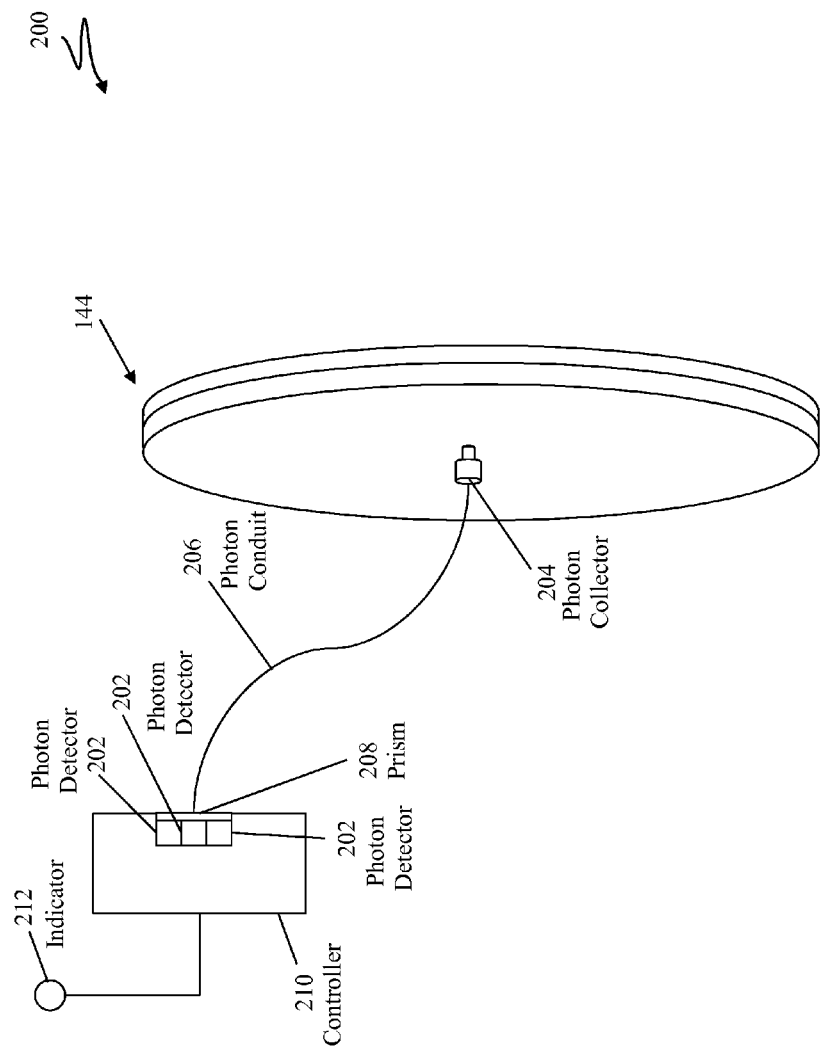
FIG. 6 shows a schematic elevational diagram of a flame detection system according to embodiments of the invention disclosed herein.

An example of an installation of a flame detection system 200 according to embodiments is shown in FIG. 6, in which a flame detector 201 may monitor premix chamber 148 via cap 144. Here, flame detector 201 may have one or more photon detectors 202 in photonic communication with a photon collector 204 mounted on cap 144. Each photon collector 204 may project into a portion of premix chamber 148 that is part of the no-flame region of combustor 120, which may allow photons of a predefined range of wavelengths to be able to reach each photon collector 204 from annular flow passage 140 and/or pre-mix chamber 148. A photon conduit 206, such as a fiber optic cable, may provide photonic communication between photon collector 204 and one or more of photon detectors 202. For example, photon conduit 206 may be in optical communication with all photon detectors 202, such as via a prism 208 or the like and/or by a bundle of optical fibers being connected to each photon detector 202. Flame detector 201 may be connected to a flame detection system controller 210, and may send a signal to controller 210 in response to receiving a photon from the no-flame region. Such a signal may typically vary with intensity of emissions received by photon detector 202, so that a low number of photons would produce a relatively weak signal, while a larger number of photons would produce a stronger signal.

Controller 210 may determine whether a signal from a flame detector 201 is indicative of a flame presence in the no-flame region. For example, receipt of a signal may be construed as indicating flame presence, though in embodiments a signal may additionally have to have a strength greater than a predefined threshold strength to be construed as indicating a flame presence. Controller 210 may act in response to flame presence being indicated. For example, controller 210 may initiate an ameliorative action responsive to an indication of flame presence, such as providing a signal, activating an indicator 212, altering a fuel-air ratio, shutting down combustor 120 and/or gas turbine 100, and/or other suitable response as suggested above. As further suggested above, to reduce the likelihood of false positive flame detection in embodiments employing more than one photon detector 202, controller 210 may employ a form of voting by photon detectors 202 such that flame detection in indicated only when controller 210 receives signals from at least a predefined number of flame detectors 201 and/or photon detectors 202. For example, in the example shown in FIG. 6, in which three photon detectors 202 are used and are connected to a single photon collector 204, controller 210 may indicate flame detection when signals are received from at least two of photon detectors 202. In the example of FIG. 6, voting may not only avoid false positive detection, but also may overcome a faulty photon detector 202. In embodiments in which additional coverage is desired, more flame detectors 201 may be included. In such embodiments, the predefined number used in flame detector voting by controller 210 may still be two, but may also be higher.

Figure 7:
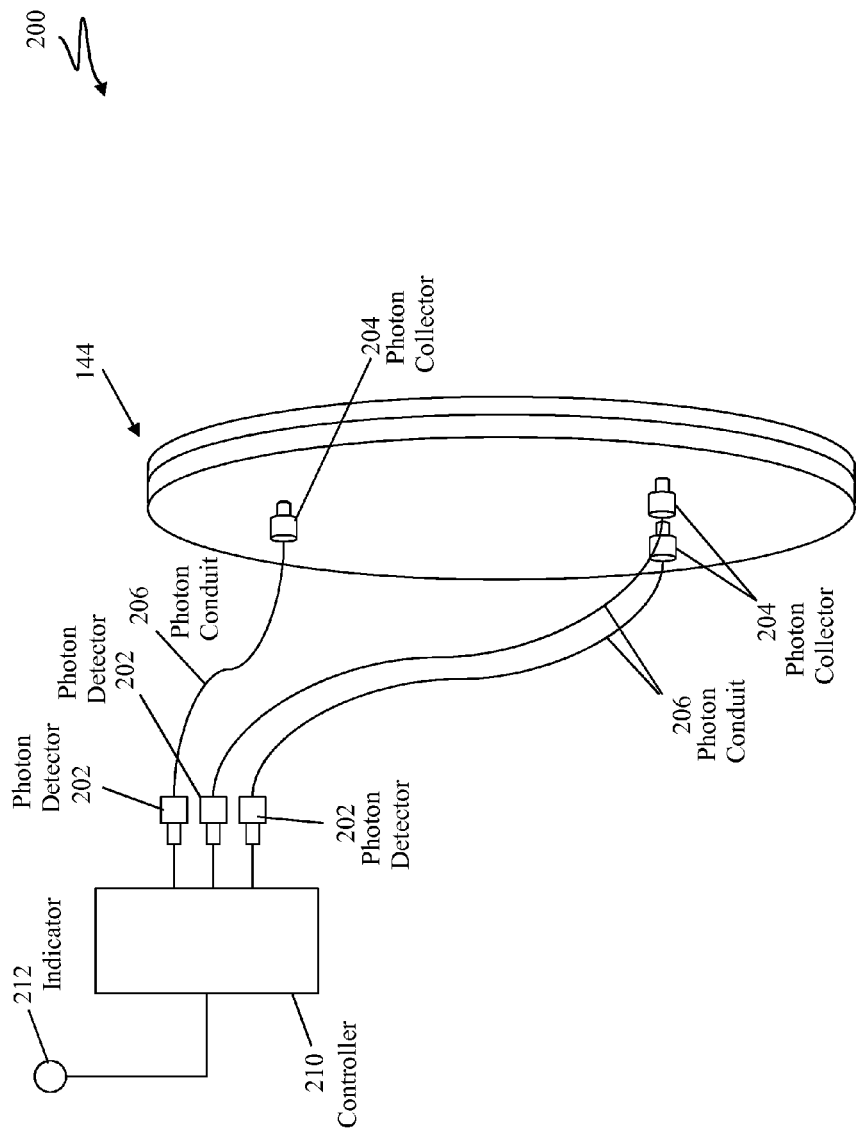
FIG. 7 shows a schematic elevational diagram of a flame detection system according to embodiments of the invention disclosed herein.

Another example of an installation of a flame detection system 200 according to embodiments is shown in FIG. 7. The example shown in FIG. 7 is similar to the example shown in FIG. 6, but includes three flame detectors 201 to monitor premix chamber 148 via cap 144. Each flame detector 201 may have a photon detector 202 in photonic communication with respective photon collectors 204 mounted on cap 144, such as at regular intervals about cap 144. A photon conduit 206, such as a fiber optic cable, may provide photonic communication between photon collectors 204 and photon detectors 202, and while a one-to-one connection is shown in FIG. 7, one or more of photon collectors 204 may be connected to multiple photon detectors 202 in similar fashion to the example shown in FIG. 6. Providing more than one flame detector 201 and/or more than one photon detector 202 provides a form of redundancy in embodiments, but may also provide an indication as to a location of flame formation. For example, a signal strength may be used to determine which flame detector 201 and/or photon detector 202 monitors a region closest to a photon source, a correlation between monitored region and photon detector may be used to determine location, and/or triangulation or the like may be employed to determine an approximate location of a photon source. Each photon detector 202 may be connected to a flame detection system controller 210, and may send a signal to controller 210 in response to receiving a photon from the no-flame region. Such a signal may typically vary with intensity of emissions received by photon detector 202, so that a low number of photons would produce a relatively weak signal, while a larger number of photons would produce a stronger signal.

Figure 8:
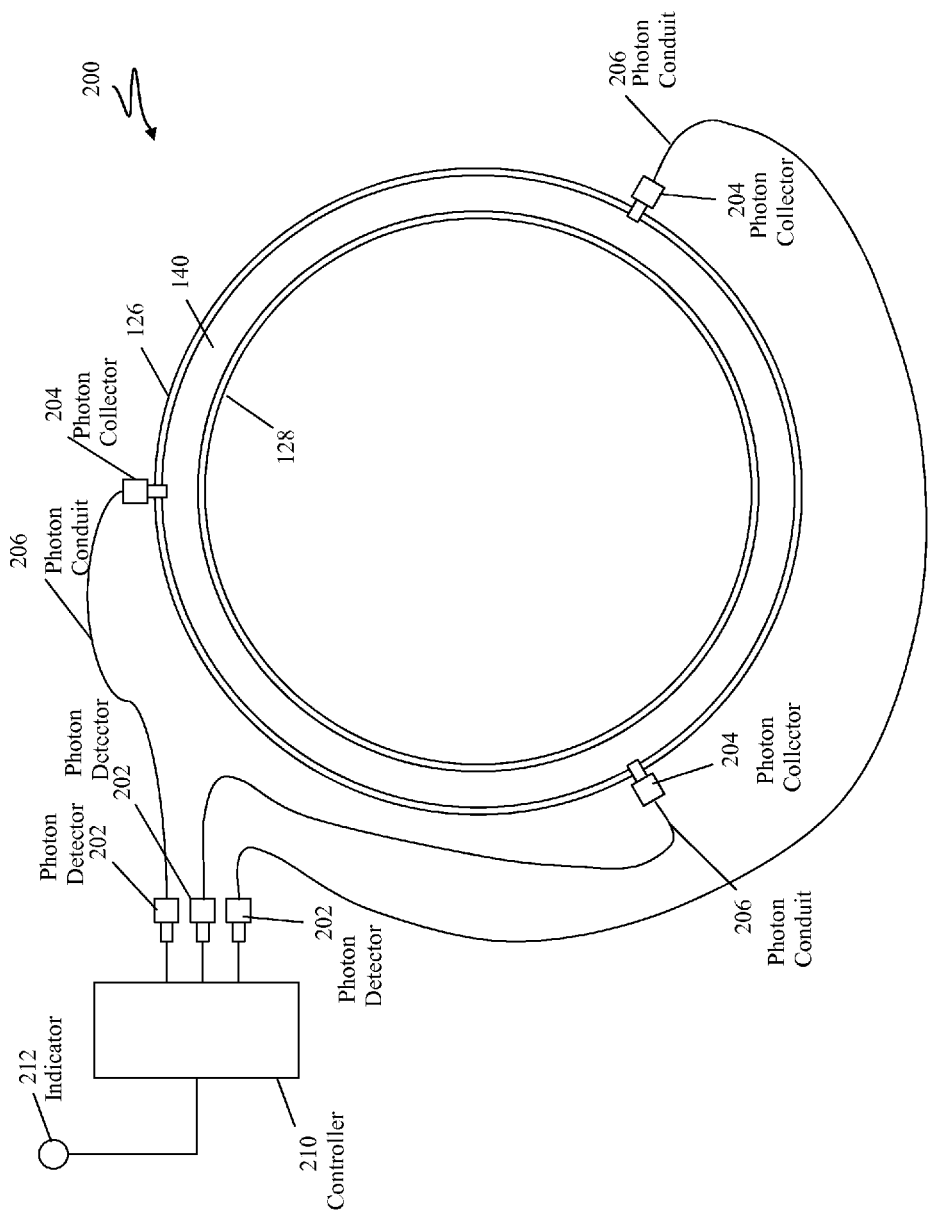
FIG. 8 shows a schematic cross sectional diagram of a flame detection system according to embodiments of the invention disclosed herein.

A further example of an installation of a flame detection system 200 according to embodiments is seen in FIG. 8. The principal difference between the arrangement of FIG. 8 and that of FIG. 7 is the arrangement of photon collectors 204. More specifically, photon collectors 204 may be mounted on combustor flow sleeve 126, such as at regular intervals about combustor flow sleeve 126. Each photon collector 204 may project into a portion of annular flow passage 140 that is part of a no-flame region of combustor 120, though all that is needed is for photons of a predefined range of wavelengths to be able to reach each photon collector 204 from annular flow passage 140 and/or premix chamber 148. As with the example shown in FIG. 6, a photon conduit 206 provides photonic communication between each photon collector 204 and a photon detector 202, which may be connected to a flame detection system controller 210 so that each flame detector 201 and/or photon detector 202 may send a signal to controller 210 in response to receiving a photon from the no-flame region. In embodiments in which additional coverage is desired, more flame detector 201 and/or photon detectors 202 may be included, and in such embodiments the predefined number used in flame detector 201 and/or photon detector voting by controller 210 may still be two, but may also be higher. Further, though each collector 204 is shown as being connected to one photon detector 202, it should be understood that any or all of collectors 204 may be connected to more than one photon detector 202, such as in the manner(s) described above with respect to the example shown in FIG. 6.

Figure 9:
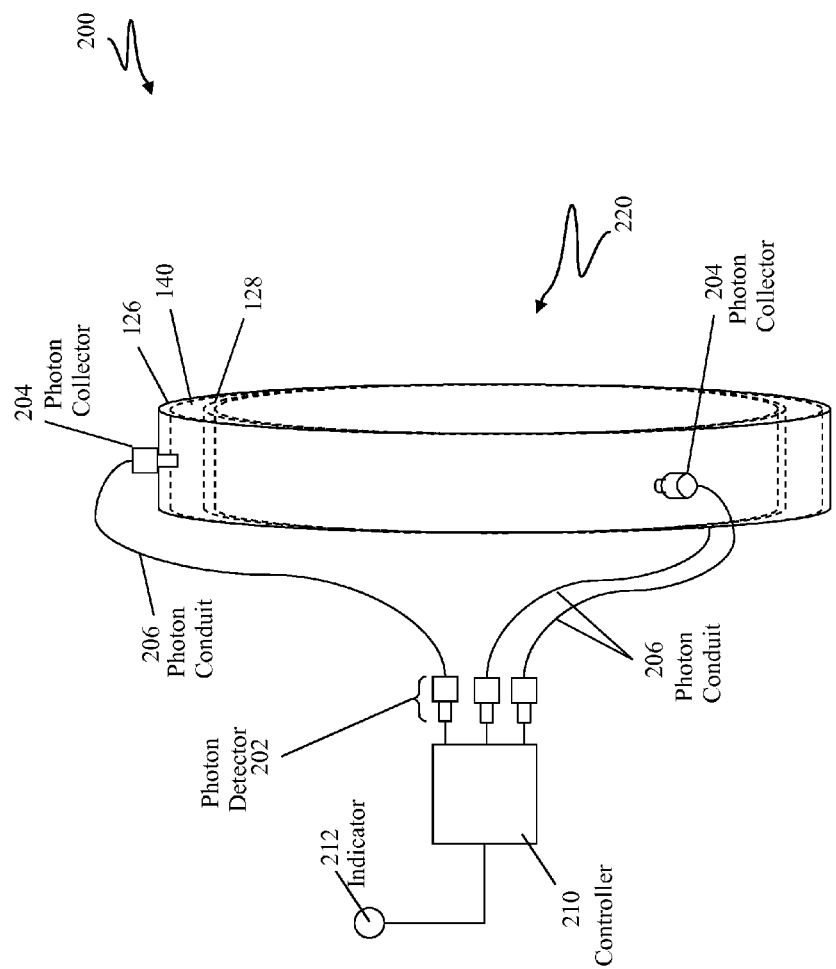
FIG. 9 shows a schematic elevational side view diagram of a flame detection system according to embodiments of the invention disclosed herein.

Because each photon collector 204 may have a limited field of view and/or limited range, photon collectors 204 of an installation such as that seen in FIG. 8 may form a detection annulus 220, as shown in FIG. 9. By placing two or more such installations adjacent one another, and by having overlap between them, enhanced coverage of the no-flame region may be achieved. Examples of such arrangements are shown in FIGS. 10-13 and employ various configurations of flame detectors and controllers.

Figure 10:
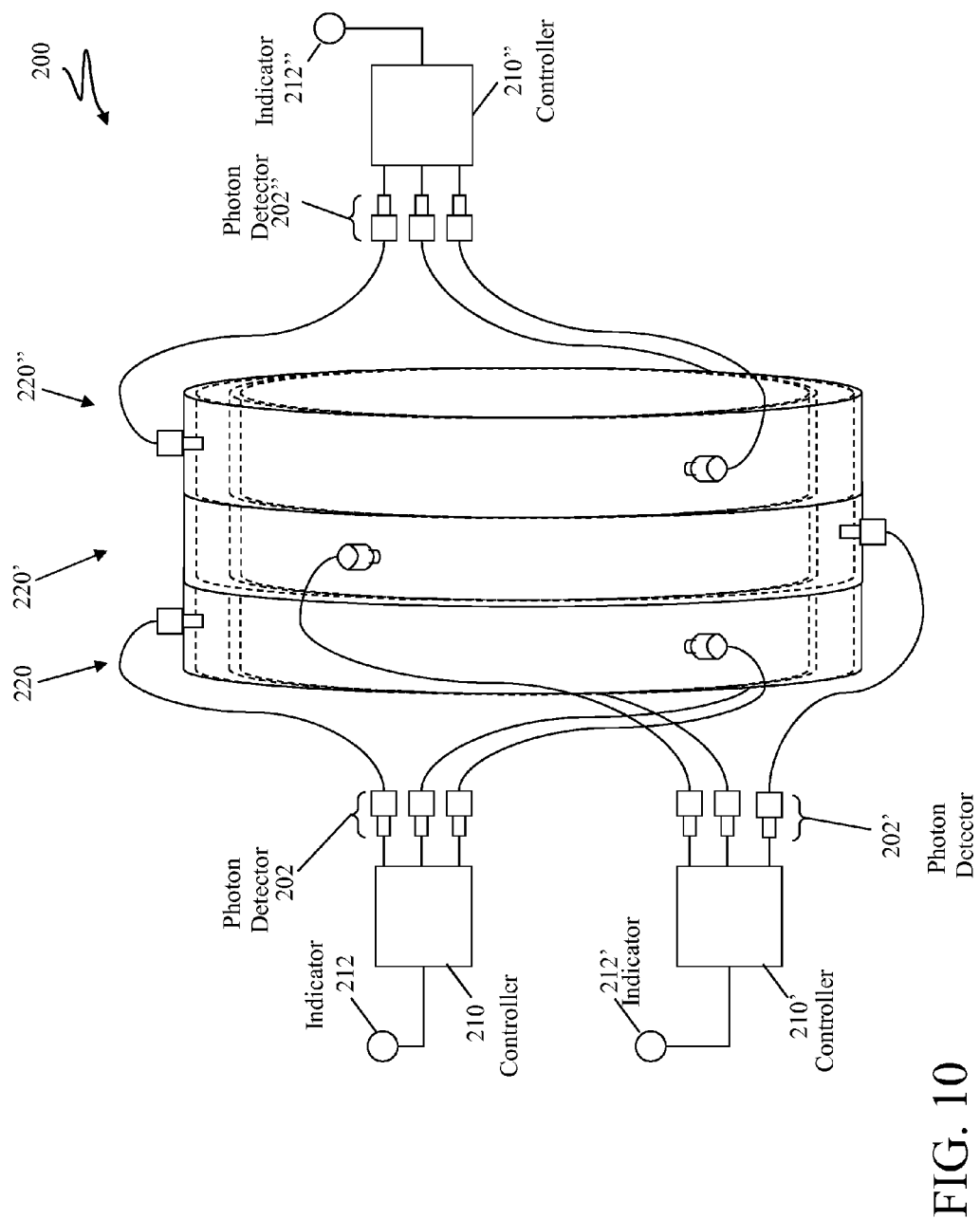
FIG. 10 shows a schematic elevational side view diagram of a flame detection system according to embodiments of the invention disclosed herein.
Figure 11:
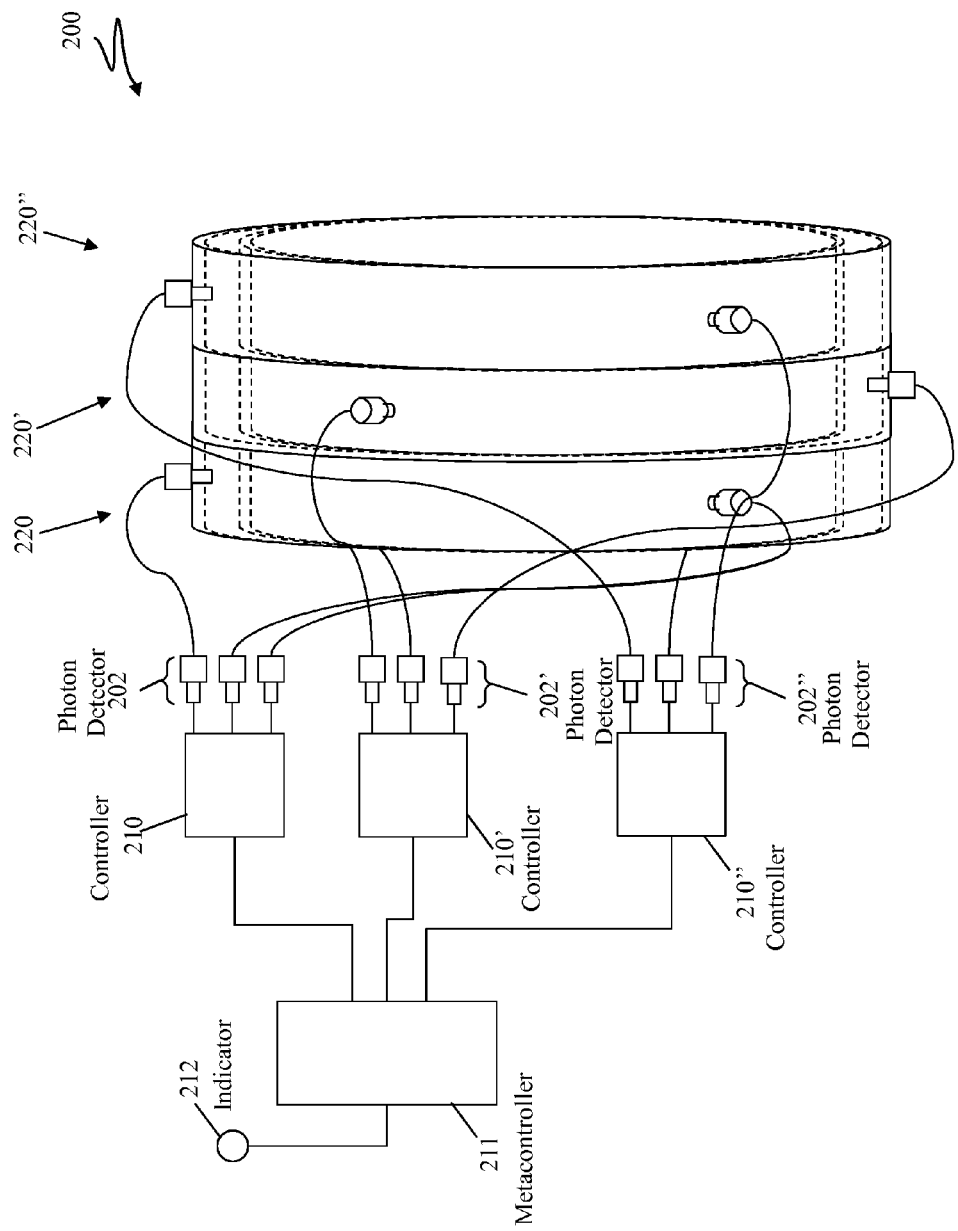
FIG. 11 shows a schematic elevational side view diagram of a flame detection system according to embodiments of the invention disclosed herein.
Figure 12:
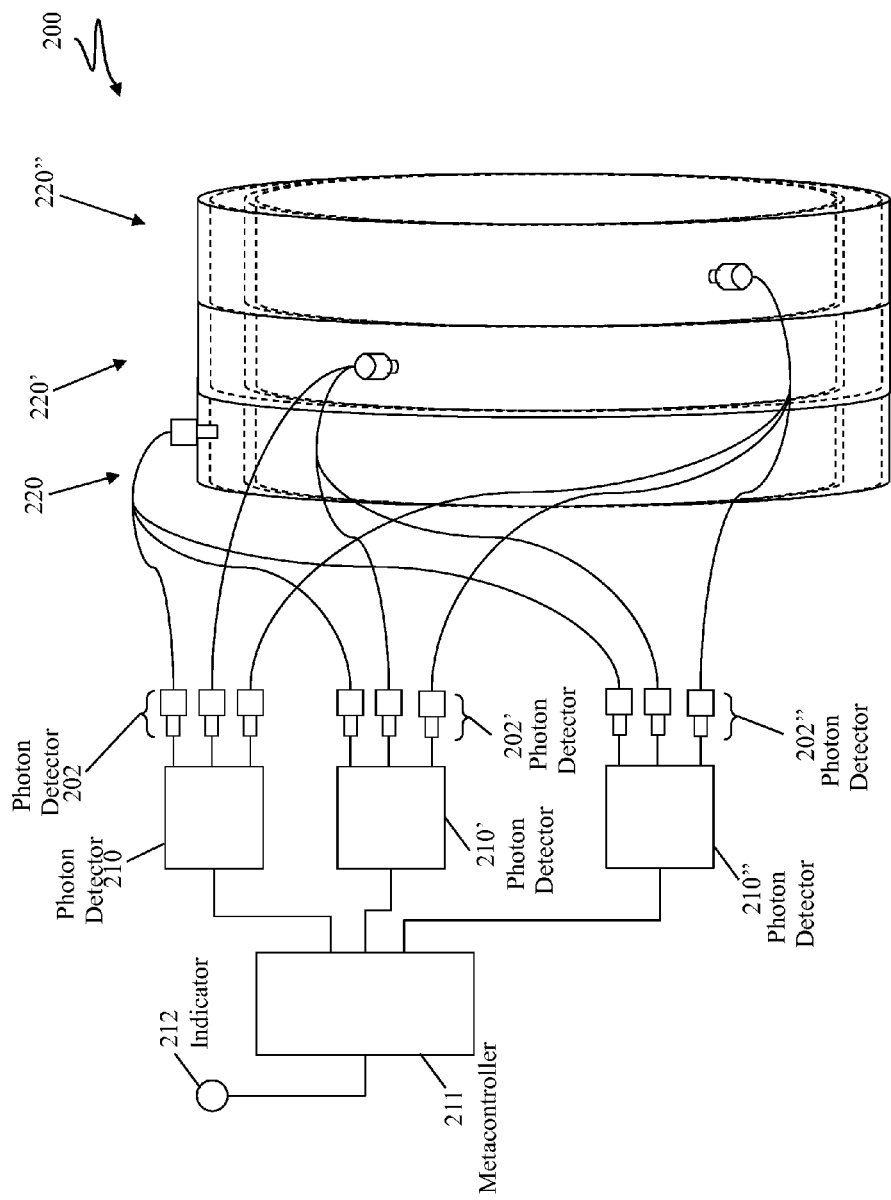
FIG. 12 shows a schematic elevational side view diagram of a flame detection system according to embodiments of the invention disclosed herein.
Figure 13:
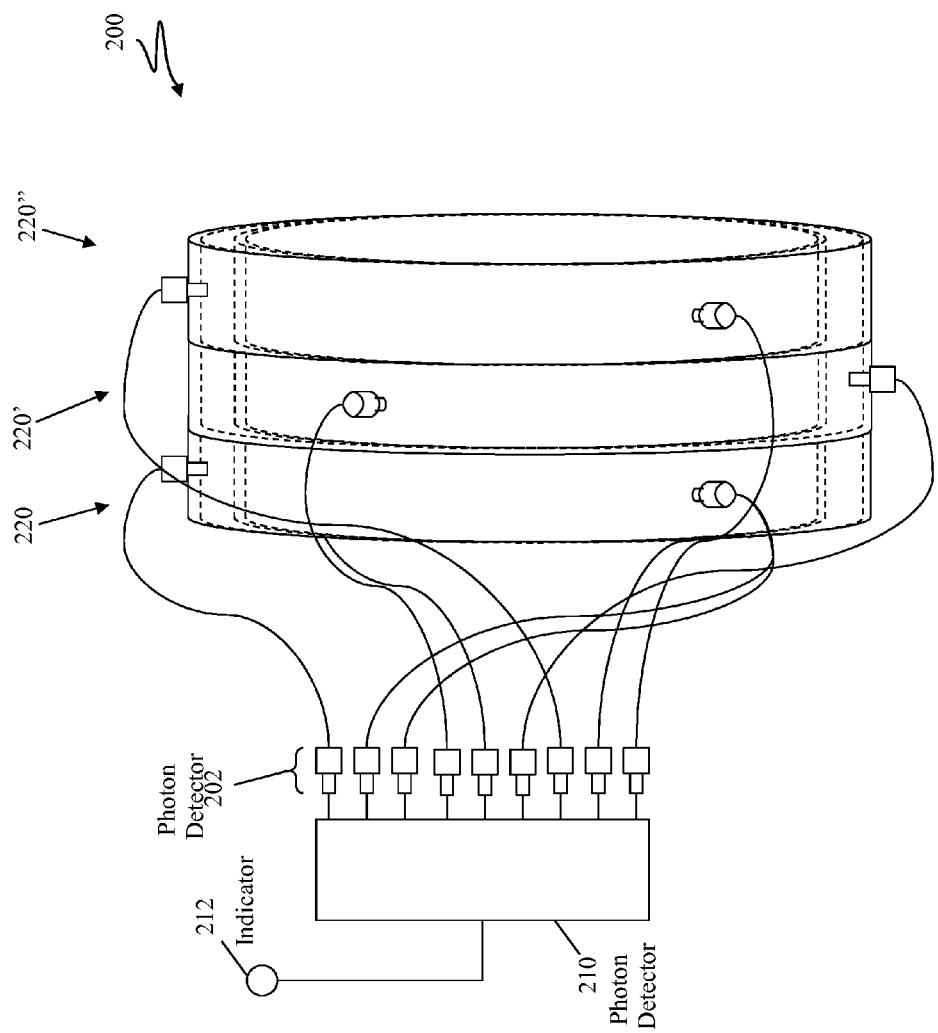
FIG. 13 shows a schematic elevational side view diagram of a flame detection system according to embodiments of the invention disclosed herein.

As seen in FIG. 10, three detection annuli 220, 220', 220" may each have three photon detectors 202, 202', 202" that in embodiments may alternate or otherwise vary position of respective photon collectors to further enhance coverage. In FIG. 10, each detection annulus 220, 220', 220" may have its own flame detection system controller 210, 210', 210" that may determine whether flame presence is indicated in its respective monitored portion of the no-flame region. Additionally, each controller 210, 210', 210" may initiate action and/or provide independent indication of flame detection. Alternatively, as seen in FIG. 11, controllers 210, 210', 210" may each be connected to a metacontroller 211 that may determine whether flame presence is indicated in any monitored portion of the no-flame region. Here, "metacontroller" means a controller responsive to another controller or controllers that may also in embodiments control other controllers. Metacontroller 211 may, responsive to an indication of flame presence, initiate action and/or provide indication of flame detection. In the arrangement of FIG. 11, metacontroller 211 may, for example, initiate action and/or indicate flame detection responsive to receipt of an indication or signal from one of controllers 210, 210' 210'", or may employ a variant of the voting described above. To enhance voting and/or reduction of false positives, and/or to reduce a number of collectors 204 and/or detectors 202, each collector 204 may be connected to multiple detectors 202, 202', 202", as shown in FIG. 12. While FIG. 12 shows only one collector for each annulus 220, 220', 220", it should be understood that any suitable or desired number of collectors and/or detectors may be employed for each annulus. An additional alternative is seen in FIG. 13, in which one controller 210 receives signals from photon detectors 202 of all detection annuli 220, 220', 220". Again, voting may be employed to reduce false positives, and any or all of the collectors may be connected to more than one detector 202. Further, a location of a photon source may be determined based on, for example, which detection annulus or annuli detect(s) flame, and/or based on from which detector(s) a signal comes.

Figure 14:
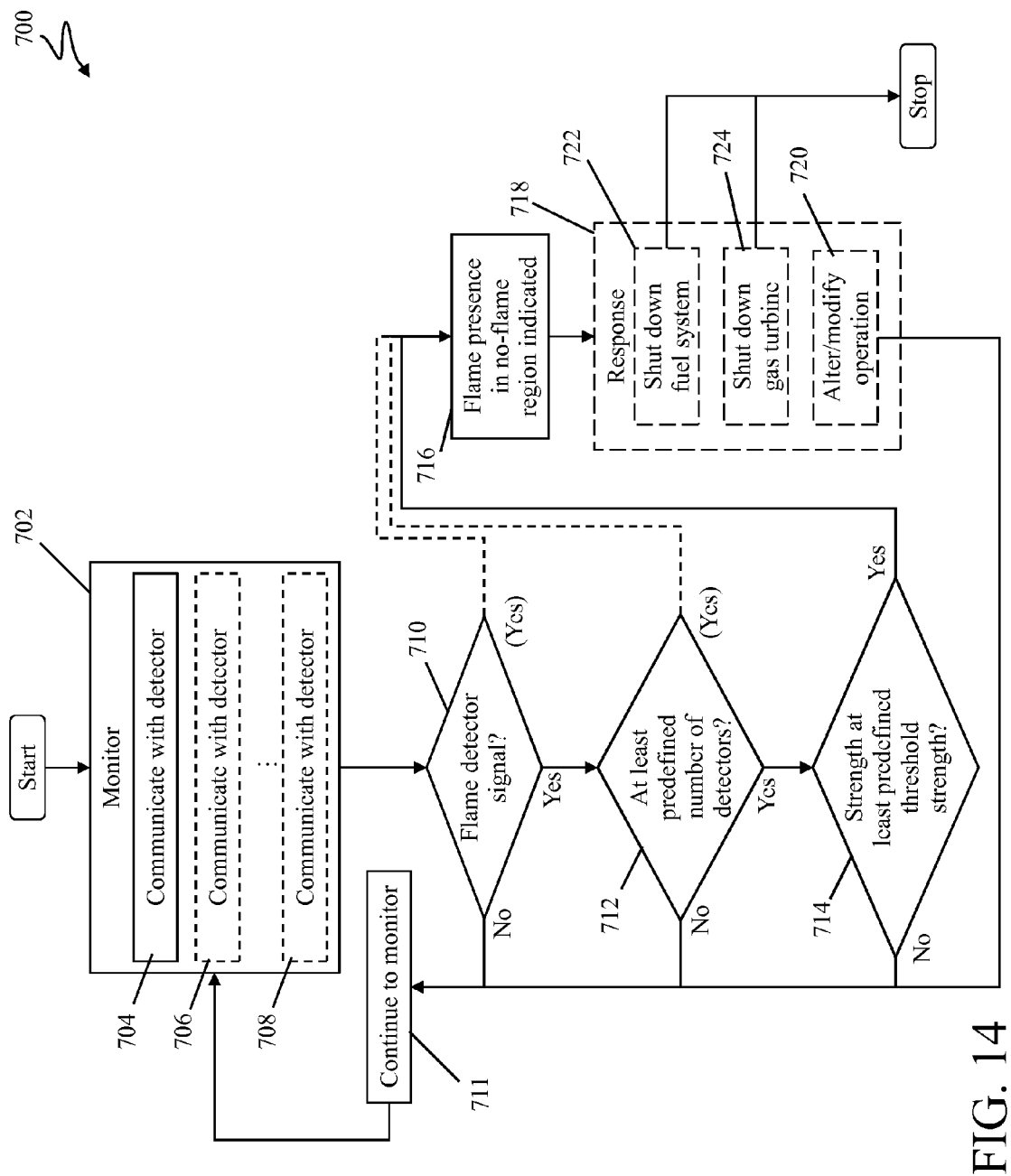
FIG. 14 shows a schematic flow diagram of a method of operation of a flame detection system according to embodiments of the invention disclosed herein.

As seen in FIG. 14, a method of operation 700 of flame detection system 200 may include monitoring (block 702), such as by using flame detection system controller 210 to monitor for signals from one or more flame detectors 201. Thus, embodiments may communicate with one or more flame detectors 201 (blocks 704-708) and check for a flame detector signal (710). If no flame detector signal has been received, then monitoring may continue (block 711, returning to block 702). If a flame detector signal has been received, embodiments may check to see if a signal is received from each of at least a predefined number of detectors, such as two detectors (block 712). If fewer than the predefined number of signals is received, then monitoring may continue (block 711, returning to block 702). If at least the predefined number of signals is received, then a check may be made to determine whether a strength of each received signal is at least as strong as a predefined threshold signal strength (block 714). In embodiments, if any received signal strength is below the threshold strength, then monitoring may continue (block 711, then to block 702). In other embodiments, monitoring may continue if fewer than the predefined number of signals is at least as strong as the threshold signal strength. If the check in block 714 yields at least the predefined number of signals having a strength at or above the threshold signal strength, then detection of flame in the no-flame region may be indicated (block 716), i.e., it may be determined that flame presence is indicated. In embodiments, a response to the indication of flame presence may be made and/or an ameliorative action may be taken (block 718). For example, operation of combustor 120 and/or gas turbine 100 may be altered or modified (block 720, then to blocks 711 and 702 to continue monitoring), such as by modifying a fuel-air ratio, a fuel system may be shut down (block 722), gas turbine 100 may be shut down (block 724), and/or another response may be undertaken as appropriate and/or desired. Embodiments thus enable signaling the presence of a flame in the no-flame region responsive to detection of a photon outside of the predefined range of wavelength and/or intensity, such as a non-infrared photon, which may cover several conditions requiring shut down or alteration of combustor and/or turbine operation in addition to formation of flame in the no-flame region. In embodiments, the response may be based on a presence and/or an intensity of a photonic signal observed, fuel properties, gas turbine operation and ambient atmosphere data, and/or other relevant characteristics and/or data. For example, the fuel-air ratio may be reduced for a weak photonic signal and relatively unreactive fuel/air mixture, while the entire gas turbine may be shut down for inspection responsive to a strong photonic signal, relatively reactive fuel/air mixtures, and/or other relevant characteristics and/or data.

Embodiments may vary the criteria by which it is determined that flame presence is indicated. Thus, while method 700 of FIG. 14 has been described as determining that flame presence is indicated responsive to at least a predefined number of flame detector signals being at least a strong as a predefined threshold, some of these conditions may be omitted and/or modified. For example, referring to FIG. 14, receipt of a flame detector signal itself (as determined in block 710) may be enough to determine that flame presence is indicated (dashed line to block 716). Alternatively, embodiments may include that signals must be received from at least a predefined number of detectors (going from block 710 to block 712 to block 716), or may ignore a number of signals received and check whether a signal is at least as strong as a predefined threshold strength (going from block 710 to block 714 to block 716).

Figure 15:
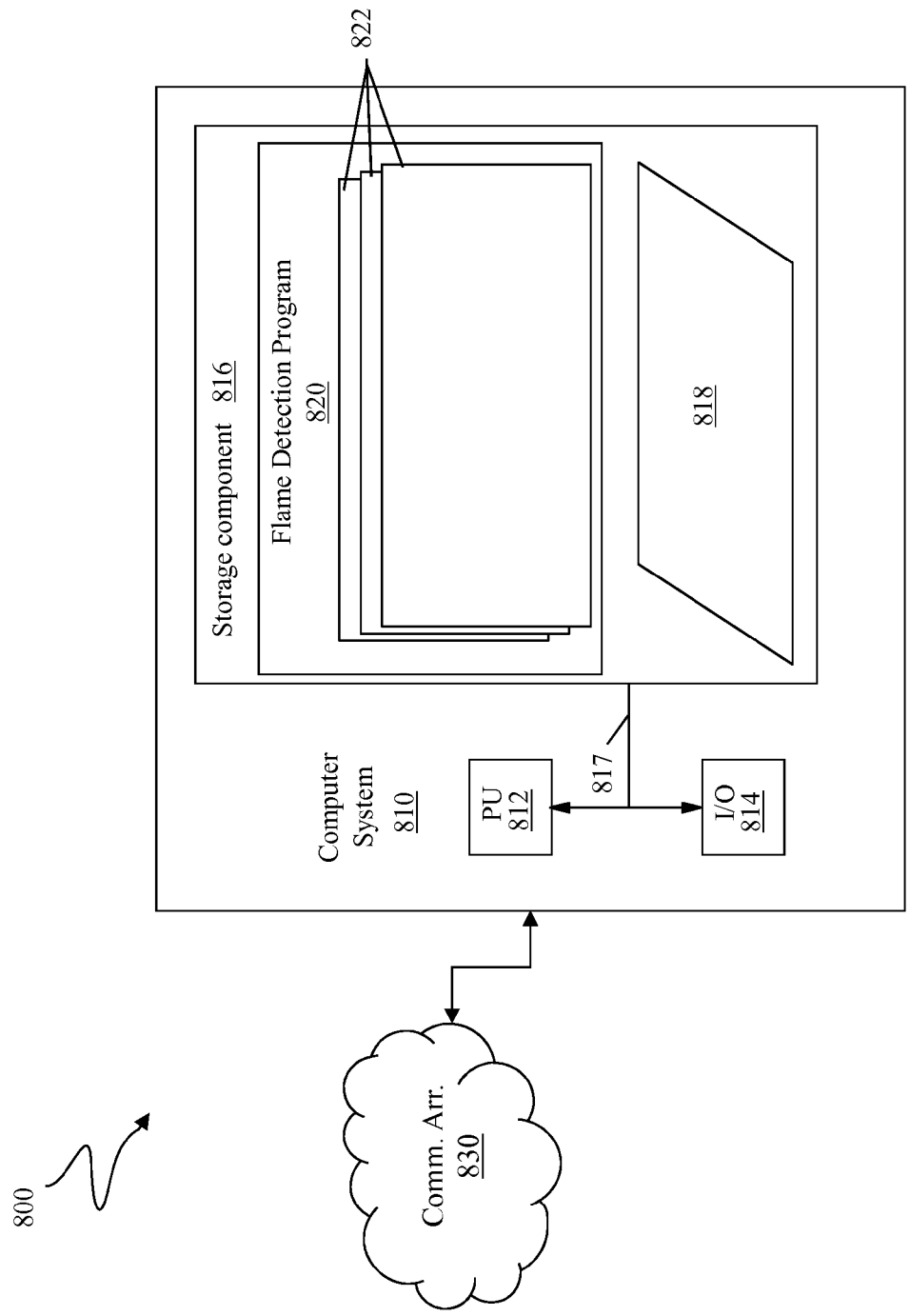
FIG. 15 shows a schematic block diagram of a computing environment for implementing flame detection according to embodiments of the invention disclosed herein.

Turning to FIG. 15, an illustrative environment 800 for a flame detection computer program product is schematically illustrated according to an embodiment of the invention. To this extent, environment 800 includes a computer system 810, such as flame detection system 200, controller 210, and/or other computing device that may be part of a gas turbine that may perform a process described herein in order to execute a flame detection method according to embodiments. In particular, computer system 810 is shown including a flame detection program 820, which makes computer system 810 operable to manage data in a flame detection control system or controller by performing a process described herein, such as an embodiment of the flame detection method 700 discussed above.

Computer system 810 is shown including a processing component or unit (PU) 812 (e.g., one or more processors), an input/output (I/O) component 814 (e.g., one or more I/O interfaces and/or devices), a storage component 816 (e.g., a storage hierarchy), and a communications pathway 817. In general, processing component 812 executes program code, such as flame detection program 820, which is at least partially fixed in storage component 816, which may include one or more computer readable storage medium or device. While executing program code, processing component 812 may process data, which may result in reading and/or writing transformed data from/to storage component 816 and/or I/O component 814 for further processing. Pathway 817 provides a communications link between each of the components in computer system 810. I/O component 814 may comprise one or more human I/O devices, which enable a human user to interact with computer system 810 and/or one or more communications devices to enable a system user to communicate with computer system 810 using any type of communications link. In addition, I/O component 814 may include one or more sensors, such as flame detector 201 discussed above. In embodiments, a communications arrangement 830, such as networking hardware/software, enables computing device 810 to communicate with other devices in and outside of a node in which it is installed. To this extent, flame detection program 820 may manage a set of interfaces (e.g., graphical user interface(s), application program interface, and/or the like) that enable human and/or system users to interact with flame detection program 820. Further, flame detection program 820 may manage (e.g., store, retrieve, create, manipulate, organize, present, etc.) data, such as flame detection data 818, using any solution. In embodiments, data may be received from one or more sensors, such as flame detectors 201 discussed above.

Computer system 810 may comprise one or more general purpose computing articles of manufacture (e.g., computing devices) capable of executing program code, such as flame detection program 820, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. Additionally, computer code may include object code, source code, and/or executable code, and may form part of a computer program product when on at least one computer readable medium. It is understood that the term "computer readable medium" may comprise one or more of any type of tangible medium of expression, now known or later developed, from which a copy of the program code may be perceived, reproduced, or otherwise communicated by a computing device. For example, the computer readable medium may comprise: one or more portable storage articles of manufacture, including storage devices; one or more memory/storage components of a computing device; paper; and/or the like. Examples of memory/storage components and/or storage devices include magnetic media (floppy diskettes, hard disc drives, tape, etc.), optical media (compact discs, digital versatile/video discs, magneto-optical discs, etc.), random access memory (RAM), read only memory (ROM), flash ROM, erasable programmable read only memory (EPROM), or any other tangible computer readable storage medium now known and/or later developed and/or discovered on which the computer program code is stored and with which the computer program code can be loaded into and executed by a computer. When the computer executes the computer program code, it becomes an apparatus for practicing the invention, and on a general purpose microprocessor, specific logic circuits are created by configuration of the microprocessor with computer code segments.

A technical effect of the executable instructions is to implement a flame detection method and/or system and/or computer program product that uses a flame detector to monitor a no-flame region in a gas turbine for flame holding and/or formation, particularly in regions of a combustor between a combustor inlet and a combustion chamber. The flame detector may emit a signal upon receipt of a photon in a predefined range of wavelength, which signal may be received by a controller that may activate an indicator and/or initiate another action, such as shutting down at least a portion of the combustor and/or gas turbine engine. Where multiple flame detectors are used, a voting arrangement may be used to avoid false positive flame detection.

The computer program code may be written in computer instructions executable by the controller, such as in the form of software encoded in any programming language. Examples of suitable computer instruction and/or programming languages include, but are not limited to, assembly language, Verilog, Verilog HDL (Verilog Hardware Description Language), Very High Speed IC Hardware Description Language (VHSIC HDL or VHDL), FORTRAN (Formula Translation), C, C++, C#, Java, ALGOL (Algorithmic Language), BASIC (Beginner All-Purpose Symbolic Instruction Code), APL (A Programming Language), ActiveX, Python, Perl, php, Tcl (Tool Command Language), HTML (HyperText Markup Language), XML (eXtensible Markup Language), and any combination or derivative of one or more of these and/or others now known and/or later developed and/or discovered. To this extent, flame detection program 820 may be embodied as any combination of system software and/or application software.

Further, flame detection program 820 may be implemented using a set of modules 822. In this case, a module 822 may enable computer system 810 to perform a set of tasks used by flame detection program 820, and may be separately developed and/or implemented apart from other portions of flame detection program 820. As used herein, the term "component" means any configuration of hardware, with or without software, which implements the functionality described in conjunction therewith using any solution, while the term "module" means program code that enables a computer system 810 to implement the actions described in conjunction therewith using any solution. When fixed in a storage component 816 of a computer system 810 that includes a processing component 812, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 810.

When computer system 810 comprises multiple computing devices, each computing device may have only a portion of flame detection program 820 fixed thereon (e.g., one or more modules 822). However, it is understood that computer system 810 and flame detection program 820 are only representative of various possible equivalent computer systems that may perform a process described herein. To this extent, in other embodiments, the functionality provided by computer system 810 and flame detection program 820 may be at least partially implemented by one or more computing devices that include any combination of general and/or specific purpose hardware with or without program code. In each embodiment, the hardware and program code, if included, may be created using standard engineering and programming techniques, respectively.

Regardless, when computer system 810 includes multiple computing devices, the computing devices may communicate over any type of communications link. Further, while performing a process described herein, computer system 810 may communicate with one or more other computer systems using any type of communications link. In either case, the communications link may comprise any combination of various types of wired and/or wireless links; comprise any combination of one or more types of networks; and/or utilize any combination of various types of transmission techniques and protocols now known and/or later developed and/or discovered.

As discussed herein, flame detection program 820 enables computer system 810 to implement a flame detection product and/or method, such as that shown schematically in FIG. 14. Computer system 810 may obtain flame detection data 818 using any solution. For example, computer system 810 may generate and/or be used to generate flame detection data 818, retrieve flame detection data 818 from one or more data stores, receive flame detection data 818 from another system or device, such as one or more of sensors 201, in or outside of a gas turbine, flame detection, flame detection system, and/or the like.

In another embodiment, the invention provides a method of providing a copy of program code, such as flame detection program 820 (FIG. 15), which implements some or all of a process described herein, such as that shown schematically in and described with reference to FIG. 14. In this case, a computer system may process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one tangible computer readable medium. In either case, the set of data signals may be transmitted/received using any type of communications link.

In still another embodiment, the invention provides a method of generating a system for implementing a flame detection product and/or method. In this case, a computer system, such as computer system 810 (FIG. 15), can be obtained (e.g., created, maintained, made available, etc.), and one or more components for performing a process described herein can be obtained (e.g., created, purchased, used, modified, etc.) and deployed to the computer system. To this extent, the deployment may comprise one or more of: (1) installing program code on a computing device; (2) adding one or more computing and/or I/O devices to the computer system; (3) incorporating and/or modifying the computer system to enable it to perform a process described herein; and/or the like.

It is understood that aspects of the invention can be implemented as part of a business method that performs a process described herein on a subscription, advertising, and/or fee basis. That is, a service provider could offer to implement a flame detection product and/or method as described herein. In this case, the service provider can manage (e.g., create, maintain, support, etc.) a computer system, such as computer system 810 (FIG. 15), that performs a process described herein for one or more customers. In return, the service provider can receive payment from the customer(s) under a subscription and/or fee agreement, receive payment from the sale of advertising to one or more third parties, and/or the like.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A gas turbine flame detection system, the gas turbine including a combustor having an inlet in fluid communication with a source of air, a combustion chamber, and a no-flame region between the inlet and the combustion chamber, the flame detection system comprising:

a flame detector in photonic communication with the no-flame region and arranged to emit a signal responsive to a photon emitted in the no-flame region, wherein the flame detector includes:
  a photon collector arranged to receive a photon emitted in the no-flame region;
  a photon detector; and
  a photon conduit in photonic communication with the photon collector at a collector end of the photon conduit and with the photon detector at a detector end of the photon conduit such that a photon emitted in the no-flame region is received by the photon collector and travels to the photon detector through the photon conduit, the photon detector being arranged to emit a signal responsive to receipt of a photon from the photon conduit; and
  a controller in communication with the flame detector, the controller being arranged to determine whether the flame detector signal indicates flame presence in the no-flame region,
  wherein the no-flame region includes a pre-mix chamber including a cap supporting one or more fuel nozzles, the one or more fuel nozzles projecting through the pre-mix chamber to a combustion chamber of the combustor, the pre-mix chamber being a region upstream of the combustion chamber, the combustion chamber and the pre-mix chamber separated by a porous plate, the one or more fuel nozzles terminating at the porous plate,
  wherein the flame detector extends through the cap between and outside the one or more fuel nozzles to monitor the pre-mix chamber.

2. The gas turbine flame detection system of claim 1, wherein the photon collector includes a non-imaging lens.

3. The gas turbine flame detection system of claim 1, wherein the photon conduit includes a fiber optic cable.

4. The gas turbine flame detection system of claim 1, wherein the photon detector includes a semiconductor device.

5. The gas turbine flame detection system of claim 4, wherein the semiconductor device includes a photodiode.

6. The gas turbine flame detection system of claim 1, wherein the no-flame region includes at least a portion of an annular flow passage of the combustor and the flame detector is in photonic communication with the no-flame region at angular intervals about a circumference of the annular flow passage to form a detection annulus about substantially an entire circumference of the no-flame region that is visible to the flame detector.

7. The gas turbine flame detection system of claim 1, wherein at least two flame detectors are in photonic communication with the no-flame region.

8. The gas turbine flame detection system of claim 7, wherein the controller determines that flame is indicated responsive to receipt of signals from at least two of the at least two flame detectors.

9. The gas turbine flame detection system of claim 1, wherein the flame detector is responsive to photons having a wavelength in a predefined range of from about 250 nanometers to about 450 nanometers.

10. The gas turbine flame detection system of claim 9, wherein the predefined range is from about 300 nanometers to about 350 nanometers.

11. A gas turbine comprising:
  a compressor;
  a combustor in fluid communication with the compressor and arranged to receive a discharge of the compressor;
  at least one fuel delivery system arranged to introduce fuel into air entering the combustor to form a fuel-air mixture;
  a combustion chamber into which the fuel-air mixture passes and arranged to host controlled combustion of the fuel-air mixture;
  a flame detector in photonic communication with the no-flame region and arranged to emit a signal responsive to a photon emitted in the no-flame region
  wherein the flame detector includes a photon collector arranged to receive a photon emitted in the no-flame region;
  a photon detector; and
  a photon conduit in photonic communication with the photon collector at a collector end of the photon conduit and with the photon detector at a detector end of the photon conduit such that a photon emitted in the no-flame region is received by the photon collector and travels to the photon detector through the photon conduit, the photon detector being arranged to emit a signal responsive to receipt of a photon from the photon conduit; and
  a controller in communication with the flame detector, the controller being arranged to determine whether the presence of a flame in the no-flame region is indicated by the signal from the flame photon detector,
  wherein the no-flame region includes a pre-mix chamber including a cap supporting one or more fuel nozzles, the one or more fuel nozzles projecting through the pre-mix chamber to a combustion chamber of the combustor, the pre-mix chamber being a region upstream of the combustion chamber, the combustion chamber and the pre-mix chamber separated by a porous plate, the one or more fuel nozzles terminating at the porous plate,
  wherein the flame detector extends through the cap between and outside the one or more fuel nozzles to monitor the pre-mix chamber.

12. The gas turbine flame detection system of claim 11, wherein at least three flame detectors are in photonic communication with the no-flame region.

13. The gas turbine flame detection system of claim 12, wherein the controller determines that a flame presence is indicated when signals from at least two flame detectors are indicative of flame presence.

14. The gas turbine flame detection system of claim 11, wherein the flame detector is responsive to photons having a wavelength in a predefined range of from about 250 nanometers to about 450 nanometers.

15. A combustor comprising:
  an inlet in fluid communication with a source of air;
  a combustor housing defining a flow path from an inlet to a combustion chamber, the combustion chamber being arranged to receive a fuel-air mixture from the flow path and to host combustion of the fuel-air mixture;
  a no-flame region in the flow path between the inlet the combustion chamber;
    a flame detector in photonic communication with the no-flame region and arranged to emit a signal responsive to receiving a photon from the no-flame region, wherein the flame detector includes a photon collector arranged to receive a photon emitted in the no-flame region;
  a photon detector; and
  a photon conduit in photonic communication with the photon collector at a collector end of the photon conduit and with the photon detector at a detector end of the photon conduit such that a photon emitted in the no-flame region is received by the photon collector and travels to the photon detector through the photon conduit, the photon detector being arranged to emit a signal responsive to receipt of a photon from the photon conduit; and a controller arranged to receive a signal from the flame detector and configured to determine whether a presence of a flame in the no-flame region is indicated by the signal, wherein the no-flame region includes a pre-mix chamber including a cap supporting one or more fuel nozzles, the one or more fuel nozzles projecting through the pre-mix chamber to a combustion chamber of the combustor, the pre-mix chamber being a region upstream of the combustion chamber, the combustion chamber and the pre-mix chamber separated by a porous plate, the one or more fuel nozzles terminating at the porous plate, wherein the flame detector extends through the cap between and outside the one or more fuel nozzles to monitor the pre-mix chamber.

16. The gas turbine flame detection system of claim 15, wherein:

at least three flame detectors are in photonic communication with the no-flame region; and the controller determines that a flame presence in the no-flame region is indicated responsive to determining that at least a predefined number of signals from the at least three flame detectors indicate flame presence.

17. The gas turbine flame detection system of claim 16, wherein the predefined number of signals from the at least three flame detectors is two.

* * * * *